United States Patent
Catalano et al.

(10) Patent No.: US 11,132,135 B2
(45) Date of Patent: Sep. 28, 2021

(54) DYNAMIC DISK REPLICATION MODE SELECTION BASED ON STORAGE AREA NETWORK LATENCY

(71) Applicant: International Business Machines Corporation, Armonk, NY (US)

(72) Inventors: Pasquale A. Catalano, Wallkill, NY (US); Michael James Becht, Poughkeepsie, NY (US); Christopher Colonna, Ossining, NY (US); Stephen Robert Guendert, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 27 days.

(21) Appl. No.: 16/381,007

(22) Filed: Apr. 11, 2019

(65) Prior Publication Data
US 2020/0326866 A1    Oct. 15, 2020

(51) Int. Cl.
*G06F 3/06* (2006.01)
*G06F 16/27* (2019.01)
*G06F 11/30* (2006.01)

(52) U.S. Cl.
CPC ............ *G06F 3/0634* (2013.01); *G06F 3/065* (2013.01); *G06F 3/067* (2013.01); *G06F 3/0611* (2013.01);
(Continued)

(58) Field of Classification Search
CPC .... G06F 3/0634; G06F 3/0611; G06F 16/273; G06F 3/065; G06F 16/275; G06F 11/3041; G06F 3/067
See application file for complete search history.

(56) References Cited

U.S. PATENT DOCUMENTS 6,490,620 B1 * 12/2002 Ditmer ................ G06F 11/0709
709/224
7,194,538 B1 * 3/2007 Rabe ..................... G06F 3/0605
709/220
(Continued)

FOREIGN PATENT DOCUMENTS

CN    102902683 A    1/2013
WO    2017171804 A1    10/2017

OTHER PUBLICATIONS

Sikora, Marcin, et al. "On the optimum number of hops in linear wireless networks." Information Theory Workshop. IEEE, 2004. (Year: 2004).*
(Continued)

*Primary Examiner* — Francisco A Grullon
(74) *Attorney, Agent, or Firm* — Cantor Colburn LLP; Steven Chiu

(57) ABSTRACT

An aspect includes monitoring, by a server, a round trip latency between a primary storage device and a secondary storage device in a SAN. The secondary storage device replicates the primary storage device in a replication mode that is either an asynchronous replication mode or a synchronous replication mode. Based on the replication mode being the asynchronous replication mode and on detecting that the round trip latency has decreased to a value below a synchronous latency threshold value, the replication mode is set to the synchronous replication mode. Based on the replication mode being the synchronous replication mode and on detecting that the round trip latency has increased to a value above the synchronous latency threshold value, the replication mode is set to the asynchronous replication mode. The monitoring is repeated.

20 Claims, 5 Drawing Sheets

(52) U.S. Cl.
CPC ........ *G06F 11/3041* (2013.01); *G06F 16/273* (2019.01); *G06F 16/275* (2019.01)

(56) References Cited

U.S. PATENT DOCUMENTS

| | | | |
|---|---|---|---|
| 7,694,086 B1* | 4/2010 | Bezbaruah | G06F 11/1451 |
| | | | 711/162 |
| 7,805,566 B2* | 9/2010 | Abouelwafa | G06F 3/0613 |
| | | | 703/25 |
| 8,001,307 B1 | 8/2011 | Gole et al. | |
| 8,108,580 B1 | 1/2012 | Chatterjee et al. | |
| 8,341,115 B1* | 12/2012 | Natanzon | G06F 11/1471 |
| | | | 707/613 |
| 9,641,605 B2 | 5/2017 | Patterson et al. | |
| 9,710,171 B2* | 7/2017 | Craddock | G06F 3/0613 |
| 9,807,164 B2 | 10/2017 | Wareing | |
| 9,916,203 B1 | 3/2018 | Pogde et al. | |
| 9,959,063 B1* | 5/2018 | Meiri | G06F 3/0619 |
| 10,114,582 B1* | 10/2018 | Rao | G06F 3/0683 |
| 2002/0131365 A1* | 9/2002 | Barker | H04L 47/32 |
| | | | 370/235 |
| 2004/0246775 A1* | 12/2004 | Covington | G11C 11/15 |
| | | | 365/173 |
| 2008/0288543 A1* | 11/2008 | Barnett | H04L 43/0864 |
| 2009/0055593 A1* | 2/2009 | Satoyama | G06F 3/067 |
| | | | 711/134 |
| 2012/0147779 A1* | 6/2012 | Burckart | H04L 47/283 |
| | | | 370/252 |
| 2015/0046668 A1* | 2/2015 | Hyde, II | G06F 3/0689 |
| | | | 711/162 |
| 2015/0281028 A1* | 10/2015 | Akhter | H04L 43/0858 |
| | | | 370/252 |
| 2015/0378767 A1* | 12/2015 | Tarasuk-Levin | G06F 9/5088 |
| | | | 718/1 |
| 2016/0036623 A1* | 2/2016 | Clarkson | G06F 11/3495 |
| | | | 714/4.11 |

OTHER PUBLICATIONS

Rumble, Stephen M., et al. "It's Time for Low Latency." HotOS. vol. 13. 2011. (Year: 2011).*

* cited by examiner

DYNAMIC DISK REPLICATION MODE SELECTION BASED ON STORAGE AREA NETWORK LATENCY

BACKGROUND

The present invention relates generally to storage area networks (SANs), and more specifically to dynamic disk replication mode selection based on SAN latency.

A SAN is a dedicated high-speed network that interconnects and presents shared pools of storage devices to multiple computer servers. A SAN moves storage resources off of the common user network and reorganizes them into an independent, high performance network. This allows each server to access shared storage as if it were a drive directly attached to the server.

SUMMARY

Embodiments include a method, system, and computer program product for dynamic disk replication mode selection based on storage area network (SAN) latency. A method includes monitoring, by a server, a round trip latency between a primary storage device and a secondary storage device in a SAN. The secondary storage device replicates the primary storage device in a replication mode that is either an asynchronous replication mode or a synchronous replication mode. Based on the replication mode being the asynchronous replication mode and on detecting that the round trip latency has decreased to a value below a synchronous latency threshold value, the replication mode is set to the synchronous replication mode. Based on the replication mode being the synchronous replication mode and on detecting that the round trip latency has increased to a value above the synchronous latency threshold value, the replication mode is set to the asynchronous replication mode. The monitoring is repeated.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
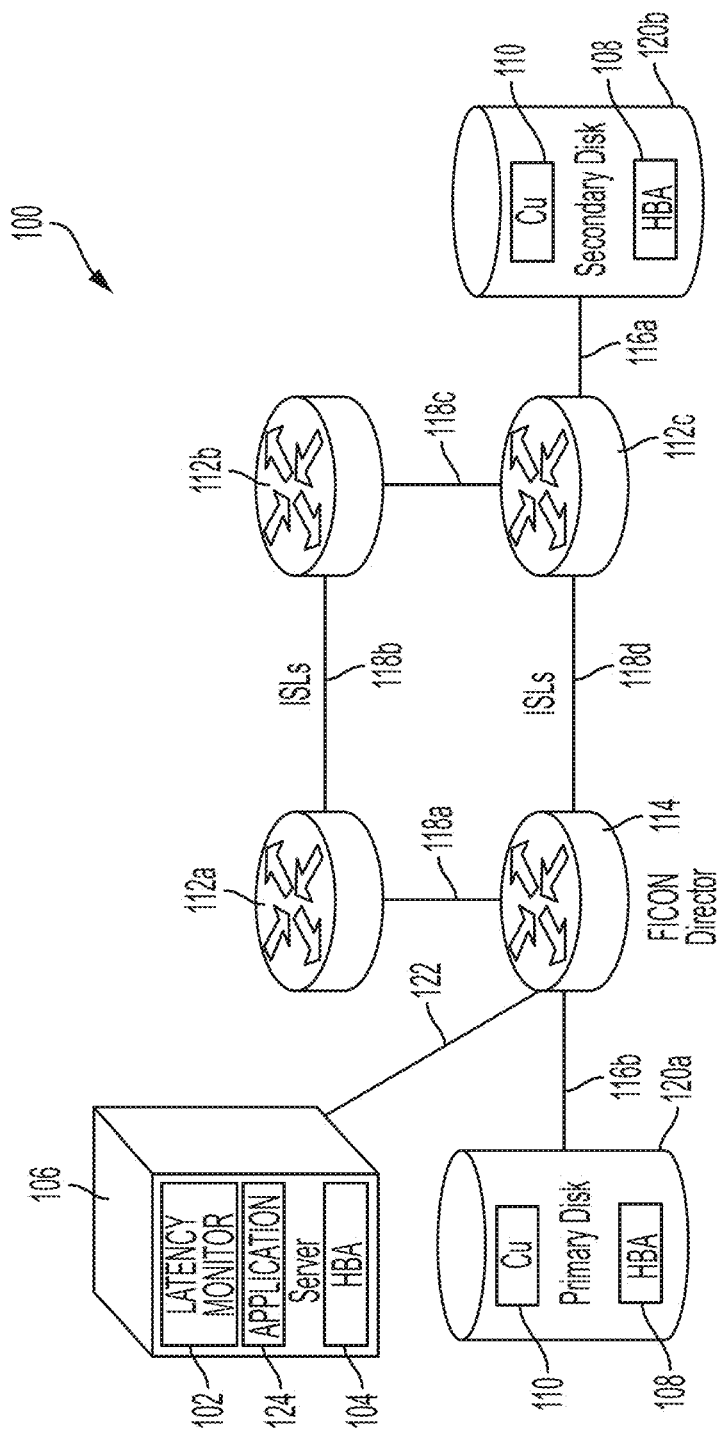
FIG. 1 illustrates a block diagram of components of a system for disk replication in a storage area network (SAN) in accordance with one or more embodiments of the present invention.

One or more embodiments of the present invention provide dynamic disk replication mode selection based on periodic monitoring of storage area network (SAN) latency during system operation. Embodiments described herein are compared to contemporary approaches where determining whether a disk replication mode is set to asynchronous or synchronous is performed once when the replication is set up (not during system operation) and is based on static SAN latency estimates and application performance. This static approach to deciding on a replication mode can be problematic for example in a cascade multi-hop SAN environment where route lengths, and therefore SAN latencies, can change drastically in a loss of inter-switch link (ISL) connectivity scenario. Also, in software defined networks (SDNs), latency can vary when the SAN is reconfigured physically via a SAN controller and there are latency changes in the virtual SAN.

As known in the art, disk replication refers to the process of storing a duplicate copy of contents of a primary storage device in a secondary storage device. This can provide an extra measure of redundancy in the event that the primary storage device fails. The disk replication mode can be synchronous or asynchronous.

When a system is running in a synchronous replication mode, changes in SAN latency can have negative impacts on application performance and may result in application performance metrics not being met. In accordance with one or more embodiments of the present invention, application impact is minimized by switching the replication mode from the synchronous replication mode to an asynchronous replication mode if an increase in SAN latency is detected. The server, or host, monitors the latency of the SAN from the server. If variation over a specified threshold in latency is measured, then the storage devices (e.g., control units on the storage devices) can be instructed to change the replication mode to match the new latency profile.

As known in the art, a host bus adapter (HBA) is a circuit board and/or integrated circuit adapter that provides input/output (110) processing and physical connectivity between a host processor (or server), and a storage and/or network device. An HBA can be used to relieve a host processor of both data storage and retrieval tasks.

By monitoring SAN latency during system operation, the replication mode can be updated to reflect a current SAN latency. The replication mode can be dynamically switched back and forth between synchronous mode and asynchronous mode based on a current SAN latency between a primary storage server and a storage device, or between two storage devices in the SAN. When the system is running disk replication in a synchronous mode, a write of data to a storage device is not considered complete until the data has been written (e.g., committed) to both a primary storage device and a secondary storage device. The primary storage device may be local to the server and the secondary storage device remote, or across a SAN network, from the server. When the system is running disk replication in an asynchronous mode, a write of data to a storage device is considered complete once the data has been written (e.g., committed) to the primary storage device. In accordance with one or more embodiments of the present invention, the system attempts to use the synchronous replication mode when possible (e.g., when it meets application performance requirements), and switches to asynchronous mode when latency values increase, and application performance requirements can't be met in synchronous mode.

In general, a synchronous replication mode is used for secondary storage devices that are closer to the server (e.g., local to the server) or to each other (secondary and primary storage devices) with lower SAN latencies, and asynchronous replication mode is used for secondary storage devices further away from the server or from each other with greater SAN latencies. In accordance with one or more embodiments of the present invention, when the SAN latency is below a synchronous latency threshold value, the replication mode is set to the synchronous mode, and when the SAN latency is above the synchronous latency threshold value the replication mode can be set to the asynchronous mode. As described further herein, a group of latency measures can be used to determine that the latency value has changed and/or that latency is above or below a synchronous latency threshold value. The synchronous latency threshold value can be a programmable value that can vary between applications, based for example on application performance requirements.

Turning now to FIG. 1, a block diagram 100 of components of a system for disk replication in a SAN is generally shown in accordance with one or more embodiments of the present invention. The block diagram 100 illustrates a server 106 in communication with a primary storage device 120a and a secondary storage device 120b in a SAN, with the secondary storage device 120b storing a backup copy of (or replicating) all or a subset of the primary storage device 120a. The components shown in FIG. 1 include a server 106 with a server switch connector 122 connected to a SAN that includes a primary storage device 120a, a secondary storage device 120b, switches 112a 112b 112c 114, storage device switch connections 116a 116b and ISLs 118a 118b 118c 118d.

The server 106 includes a latency monitor 102, a HBA 104 to communicate with the SAN via server switch connector 122, and an application 124 including computer instructions that write data to storage when executed. In accordance with one or more embodiments of the present invention, the server switch connector 122 is a fiber optic cable (single mode or multimode), PCI Express® External Cabling, or a wireless connection. The latency monitor 102 includes computer instructions that may be implemented in hardware and/or software executing on a processor to perform operations such as, but not limited to: monitoring SAN latency and dynamically modifying the disk replication modes based on the monitoring. In accordance with one or more embodiments of the present invention, the latency monitor 102 receives input from the HBA which is coupled to server switch connector 122.

Switches 112a 112b 112c are referred to herein collectively as switches 112, ISLs 118a 118b 118c 118d are referred to herein collectively as ISLs 118, and storage device switch connections 116a 116b as storage device switch connections 116.

The primary storage device 120a and the secondary storage device 120b which are part of the SAN are referred to herein collectively as storage devices 120. Each of the storage devices 120 shown in FIG. 1 includes a control unit 110 and an HBA 108 to communicate with switches 112 and 114 via the storage device connections. In accordance with one or more embodiments of the present invention, the control unit 110 tracks and implements a current disk replication mode, if any, and is the recipient of commands from server 106 that cause the disk replication mode to be changed.

In accordance with one or more embodiments of the present invention latency can be determined using a FICON command response (CMR) time which is tracked by FICON for the first FICON command received. In addition, if a channel command word (CCW) chain is long enough, the control unit 110 on the secondary storage device 120b will send back pacing CMRs periodically and these can also be used to track latency. This provides a latency measurement between the server 106 and the secondary storage device 120b. In accordance with one or more embodiments of the present invention, it can be assumed that the transport between the server 106 and the secondary storage device 120b, and between primary storage device 120a and the secondary storage device is the same or similar enough to get a close estimate of the latency between the control units 110.

In accordance with one or more embodiments of the present invention, the latency can be determined using the switches 112, 114 to measure latency. Contemporary switches can measure the latency over the ISLs 118 (the switch to switch latency). The server 106 can get this information from the switches 112 114 using standard control unit protocols. In the case of a multi-hop, the latency of each ISL 118 in the path can be requested and used to determine the total latency of the SAN. This may not provide the exact latency from the control unit 110 in the primary storage device 120a to the control unit 110 in the secondary storage device 120b, however because the SAN is generally the largest part of the end-to-end latency, this will gives a good approximation as to which replication mode should be utilized.

A multi-hop cascaded switch configuration is shown in FIG. 1 with a replication path between the primary storage device 120a and the secondary storage device 120b defined over storage device switch connection 116b to FICON director switch 114 to ISL 118d to switch 112c to storage device switch connection 116a.

Figure 2:
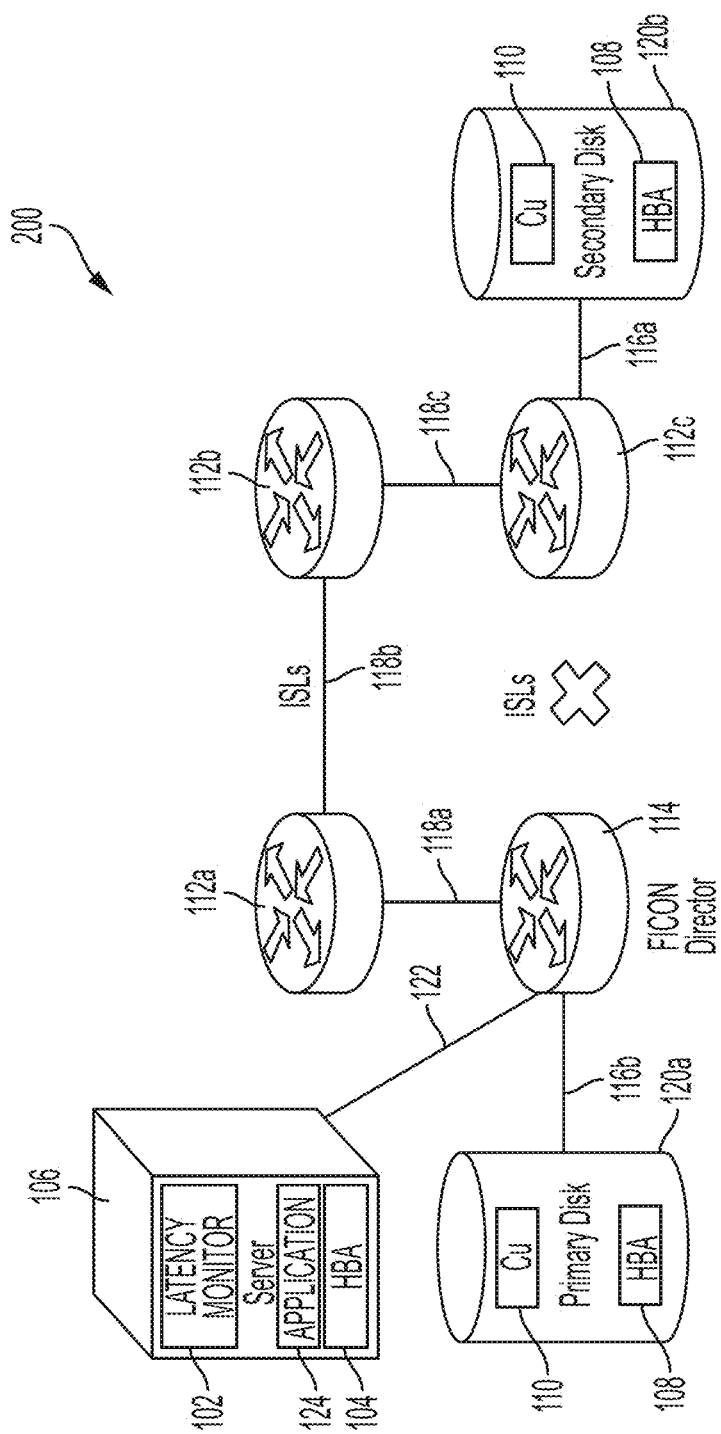
FIG. 2 illustrates a block diagram of components of a system for dynamic disk replication mode selection in a SAN in accordance with one or more embodiments of the present invention.

Turning now to FIG. 2, a block diagram 200 of components of a system for dynamic disk replication mode selection in a SAN is generally shown in accordance with one or more embodiments of the present invention. The block diagram of FIG. 2 is similar to that shown in FIG. 1, however ISL 118d loses connectivity due, for example, to a fiber break or the domain being down. As shown in FIG. 2, the replication path (previously as shown in FIG. 1 as storage device switch connection 116b to FICON director switch 114 to ISL 118d to switch 112c to storage device switch connection 116a) is rerouted over other switches that have not lost connectivity to the SAN. As shown in FIG. 2, the updated replication path between primary storage device 120a and secondary storage device 120b includes storage device switch connection 116b to FICON director switch 114 to ISL 118a to switch 112a to ISL 118b to switch 112b to ISL 118c to switch 112c to storage device switch connection 116a.

The new route shown in FIG. 2 adds latency to the replication path when compared to the replication path of FIG. 1 due to additional switching latency as well as additional distance. In contemporary implementations of disk replication in a SAN where the disk replication mode is static and set to synchronous replication mode, the updated replication path could have a significant impact on performance on the application 124 executing on the server 106. One or more embodiments of the present invention remove this performance penalty on the application 124 by detecting the added latency between the server 106 and the secondary storage device 120b and changing the disk replication mode to an asynchronous replication mode. The disk replication mode implemented by the secondary storage device 120b can be updated based on a command from the server 106. Because latency monitoring continues after entering the asynchronous replication mode, the system can switch back to a synchronous mode if the latency is reduced in the future (e.g., the switch is fixed, or new shorter paths are added to the SAN).

Figure 3:
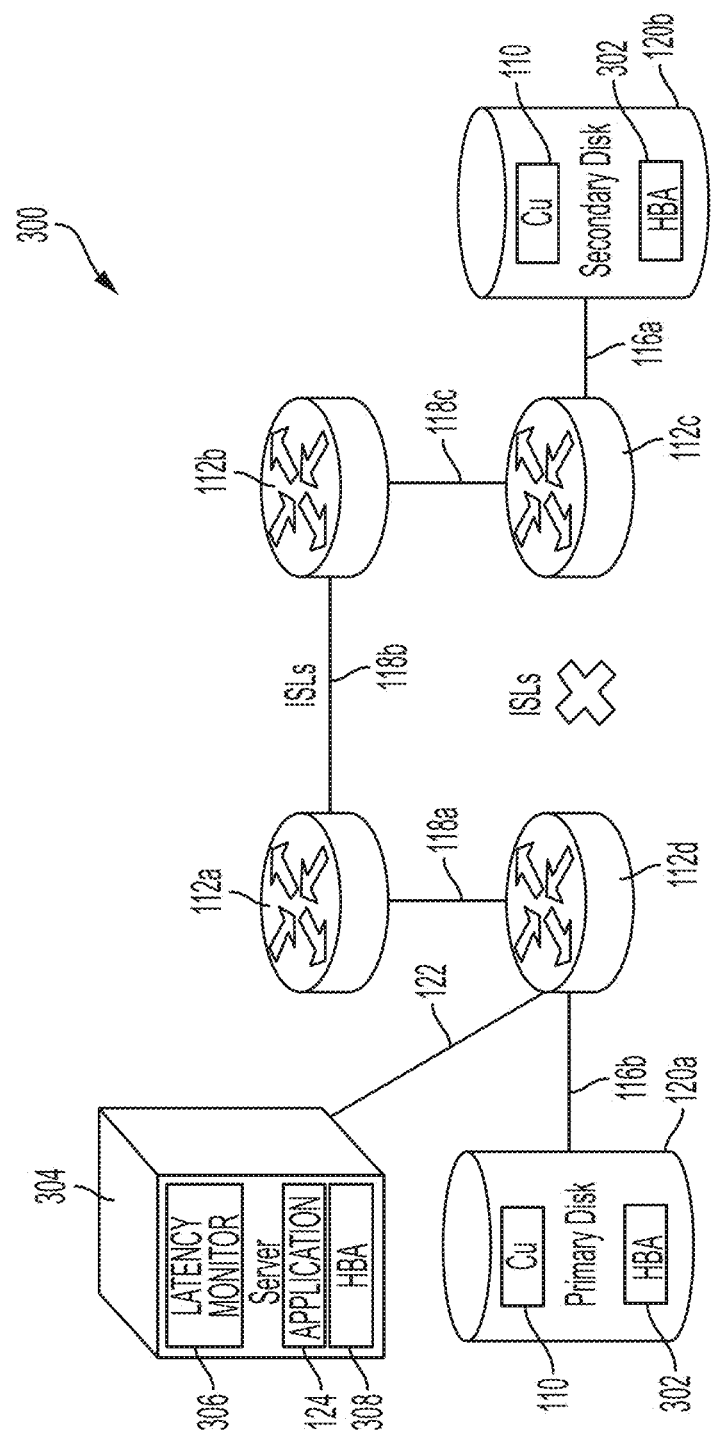
FIG. 3 illustrates a block diagram of components of a system for dynamic disk replication mode selection in a SAN in accordance with one or more embodiments of the present invention.

Turning now to FIG. 3, a block diagram 300 of components of a system for dynamic disk replication mode selection in a SAN is generally shown in accordance with one or more embodiments of the present invention. The block diagram of FIG. 3 is similar to that shown in FIG. 2 except that the FICON director switch 114 has been replaced with switch 112d, HBA 104 has been replaced with HBA 308, and the HBAs 108 have been replaced with HBAs 302 that include computer instructions for calculating the latency between them and providing the server 304 with access to the latency. Thus, HBA 302 in primary storage device 120a and HBA 302 in secondary storage device 120b monitor the latency between the primary storage device 120a and the secondary storage device 120b which is used as input to determine the round-trip latency between the server 304 and the secondary storage device 120b. As shown in FIG. 3, the updated replication path between primary storage device 120a and secondary storage device 120b includes storage device switch connection 116b to switch 112d to ISL 118a to switch 112a to ISL 118b to switch 112b to ISL 118c to switch 112c to storage device switch connection 116a.

Figure 4:
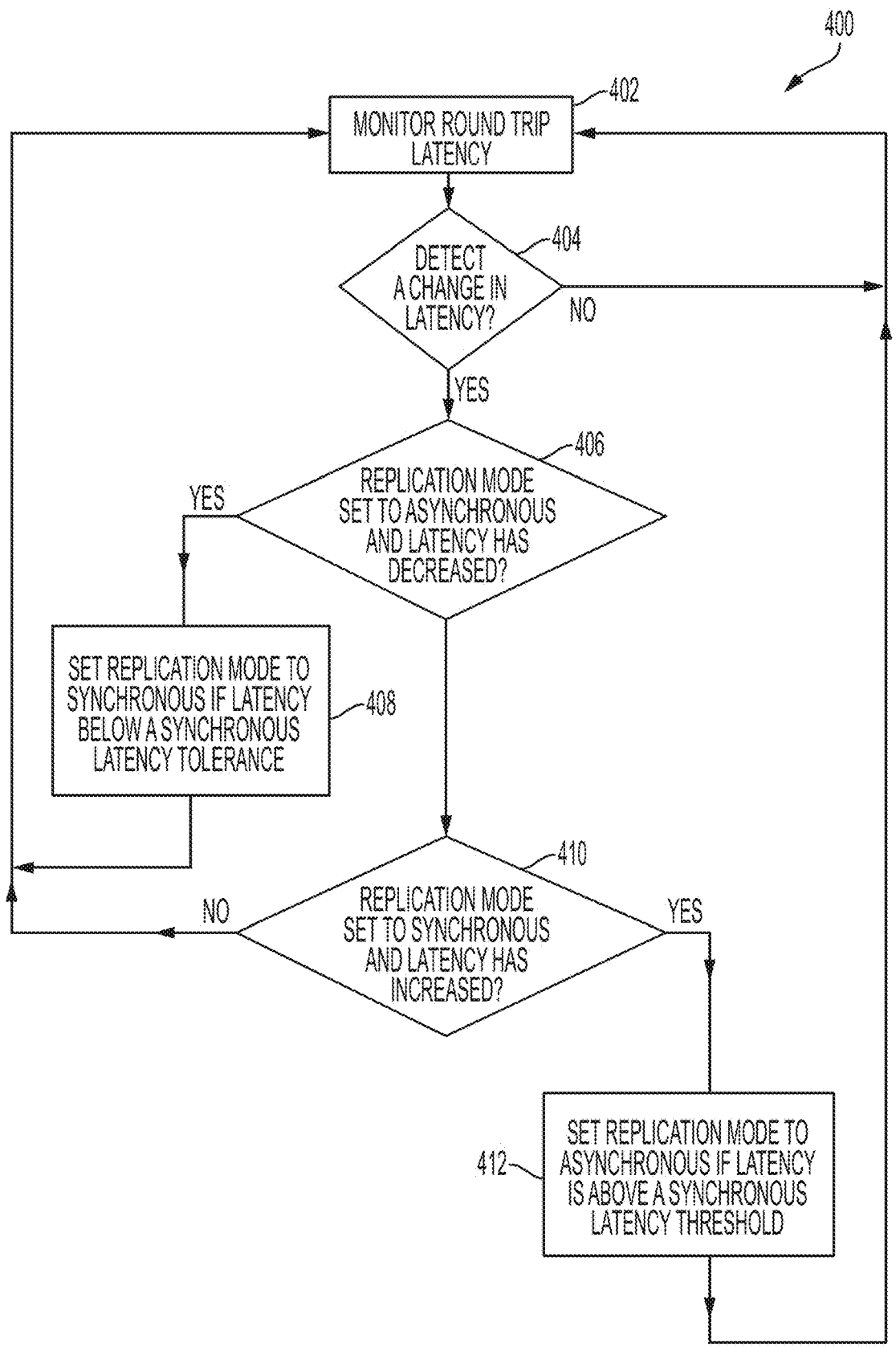
FIG. 4 illustrates a flow diagram of a process for dynamic disk replication mode selection in a SAN in accordance with one or more embodiments of the present invention.

Turning now to FIG. 4, a flow diagram 400 of a process for dynamic disk replication mode selection in a SAN is generally shown in accordance with one or more embodiments of the present invention. The process shown in FIG. 4 may be implemented, for example, by latency module 102 of FIG. 1 or latency module 306 of FIG. 3. In accordance with one or more embodiments of the present invention, the replication mode is set to an initial value of asynchronous or synchronous, based for example on an expected SAN latency and/or application requirements. At block 402, the round trip latency is monitored between a primary storage device (e.g., primary storage device 120a of FIGS. 1-3) and a secondary storage device (e.g., secondary storage device 120b of FIGS. 1-3).

At block 404, it is determined whether a change in latency has been detected. In accordance with one or more embodiments of the present invention, any change from a previous latency measurement will result in a change in latency being detected.

In accordance with one or more embodiments of the present invention, an increase in latency is detected by looking at the number of frame discards on the switches. If frames are held too long in the switch because they can't reach their destination, they will be discarded. An increasing rate of frame discards may indicate that the amount of time to traverse the SAN has increased.

One or more embodiments of the present invention look at the disk replication pair states at the primary and secondary control units. An increase in volume pairs with "copy pending" states when in the synchronous replication mode means that the primary volumes are not being synchronously mirrored and could be slowing down application performance.

If a change in latency is not detected at block 404, then processing continues at block 402 with monitoring the round trip latency.

If a change in latency is detected at block 404, then processing continues at block 406. At block 406 it is determined whether the replication mode is currently asynchronous and whether the change in the latency is a decrease in latency. If the current replication mode is asynchronous and the latency has decreased, then processing continues at block 408 where the replication mode is changed to a synchronous mode if the latency is below a synchronous latency tolerance. In accordance with one or more embodiments of the present invention, the replication mode is changed by the server issuing a command to the storage device instructing the storage device to enter the synchronous mode which will cause the storage device to wait until data has been successfully stored in the storage device before sending a write completion message to the server.

In accordance with one or more embodiments of the present invention, an average of a programmable number of previous latency monitoring results (e.g., ten, one-hundred, etc.) is used to determine whether the latency is below the synchronous latency tolerance.

In accordance with one or more embodiments of the present invention, when a multi-hop configuration is implemented, a path failure that triggers going down an alternate path with more hops (more distance) may result in the replication mode being changed to the asynchronous replication mode.

One or more embodiments of the present invention look at how data is trending. For example, when a drift in slowly increasing latency is observed, the replication mode may be changed to the asynchronous replication mode before the synchronous latency tolerance is reached.

One or more embodiments of the present invention use historical data and/or machine learning to predict times of high network utilization that might drive an increase in latency and may switch into (or remain in) the asynchronous latency mode before the predicted or event occurs. For example, a scheduled batch job that is copying a lot of data over the network may be expected to increase latency. In another example, a particular time of day may be associated with a high latency.

After the processing at block 408 is complete, processing continues at block 402 with monitoring the round trip latency between the server and the storage device.

If it is determined at block 406 that the current replication mode is not asynchronous or that the latency has not decreased, then processing continues at block 410 where it is determined whether the replication mode is currently synchronous and that the change in the latency is an increase in latency. If the current replication mode is synchronous and the latency has increased, then processing continues at block 412 where the replication mode is changed to an asynchronous mode if the latency is above the synchronous latency tolerance. In accordance with one or more embodiments of the present invention, the replication mode is changed by the server issuing a command to the storage device instructing the storage device to enter the asynchronous mode. In accordance with one or more embodiments of the present invention, an average of a programmable number of previous latency monitoring results (e.g., ten, one-hundred, etc.) is used to determine whether the latency is above the synchronous latency tolerance. Processing continues at block 402 with monitoring the round trip latency between the server and the storage device.

If it determined at block 410 that the current replication mode is not synchronous or that the latency has not increased, then processing continues at block 402 with monitoring the round trip latency. The processing shown in FIG. 4 can be repeated until the server is disconnected from the SAN.

In accordance with one or more embodiments of the present invention, the replication mode is changed from synchronous replication mode to asynchronous replication mode if a variety of different round trip latencies are measured by the monitoring at block 402. If the round trip latency values even out and they are less than the synchronous latency threshold value, the replication mode can be set to synchronous replication mode.

Figure 5:
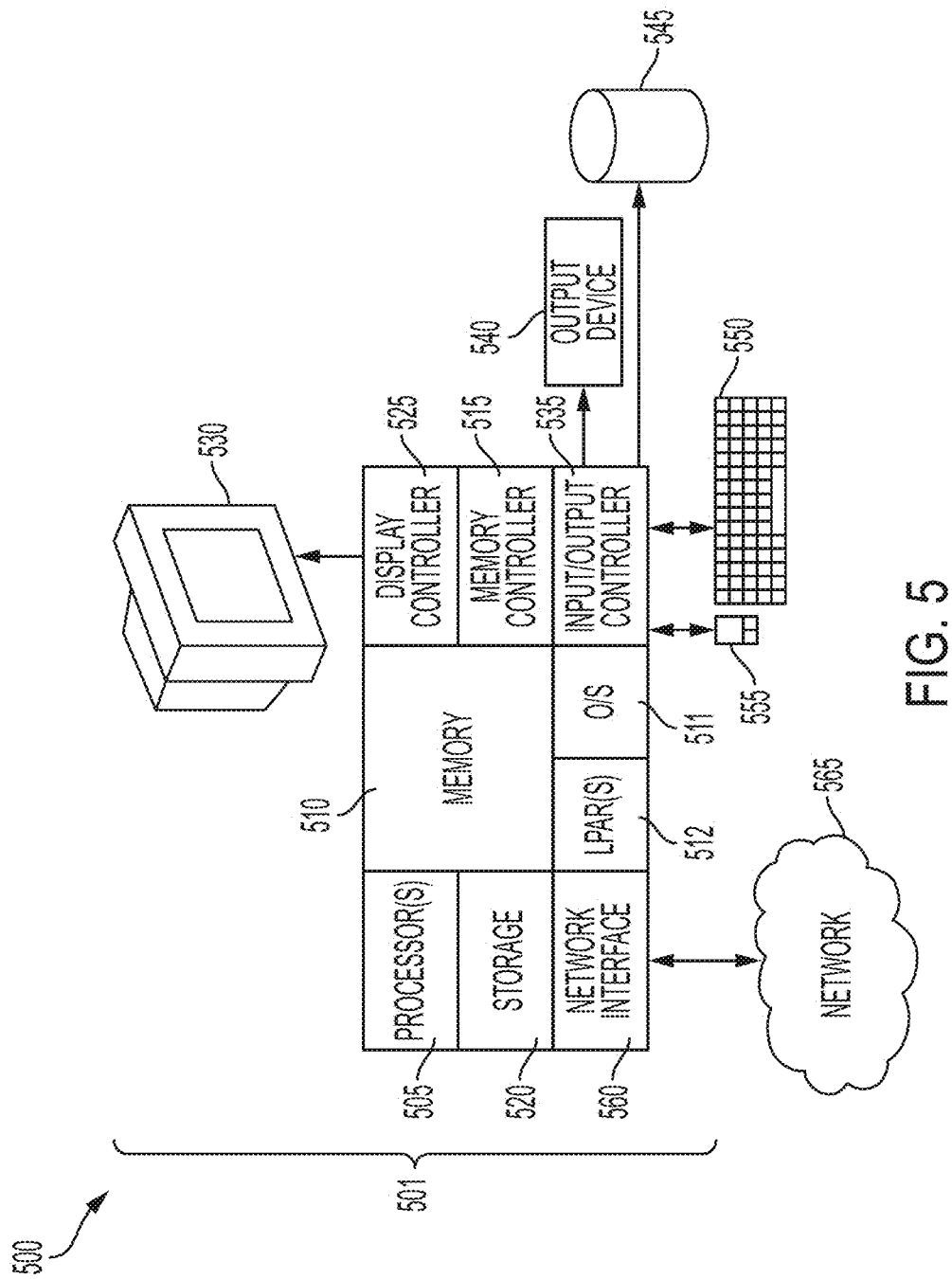
FIG. 5 illustrates a computer system for dynamic disk replication mode selection based on SAN latency in accordance with one or more embodiments of the present invention.

Turning now to FIG. 5, a computer system 500 for dynamic disk replication mode selection based on SAN latency is generally shown in accordance with one or more embodiments of the present invention. The methods described herein can be implemented in hardware, software (e.g., firmware), or a combination thereof. In an exemplary embodiment, the methods described herein are implemented in hardware as part of the microprocessor of a special or general-purpose digital computer, such as a personal computer, workstation, minicomputer, or mainframe computer. The system 500, therefore, may include a general-purpose computer or mainframe 501 capable of running multiple instances of an O/S simultaneously.

In an exemplary embodiment, in terms of hardware architecture, as shown in FIG. 5, the computer 501 includes one or more processors 505, memory 510 coupled to a memory controller 515, and one or more input and/or output (I/O) devices 540, 545 (or peripherals) that are communicatively coupled via a local input/output controller 535. The input/output controller 535 can be, for example, but not limited to, one or more buses or other wired or wireless connections, as is known in the art. The input/output controller 535 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The input/output controller 535 may include a plurality of sub-channels configured to access the output devices 540 and 545. The sub-channels may include fiber-optic communications ports.

The processor 505 is a hardware device for executing software, particularly that stored in storage 520, such as cache storage, or memory 510. The processor 505 can be any custom made or commercially available processor, a central processing unit (CPU), an auxiliary processor among several processors associated with the computer 501, a semiconductor based microprocessor (in the form of a microchip or chip set), a macroprocessor, or generally any device for executing instructions.

The memory 510 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 510 may incorporate electronic, magnetic, optical, and/or other types of storage media. Note that the memory 510 can have a distributed architecture, where various components are situated remote from one another but can be accessed by the processor 505.

The instructions in memory 510 may include one or more separate programs, each of which comprises an ordered listing of executable instructions for implementing logical functions. In the example of FIG. 5, the instructions in the memory 510 a suitable operating system (OS) 511. The operating system 511 essentially controls the execution of other computer programs and provides scheduling, input-output control, file and data management, memory management, and communication control and related services.

The memory 510 may include multiple logical partitions (LPARs) 512, each running an instance of an operating system. The LPARs 512 may be managed by a hypervisor, which may be a program stored in memory 510 and executed by the processor 505.

In an exemplary embodiment, a conventional keyboard 550 and mouse 555 can be coupled to the input/output controller 535. Other output devices such as the I/O devices 540, 545 may include input devices, for example, but not limited to a printer, a scanner, microphone, and the like. Finally, the I/O devices 540, 545 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 500 can further include a display controller 525 coupled to a display 530. In an exemplary embodiment, the system 500 can further include a network interface 560 for coupling to a network 565. The network 565 can be an IP-based network for communication between the computer 501 and any external server, client and the like via a broadband connection. The network 565 transmits and receives data between the computer 501 and external systems. In an exemplary embodiment, network 565 can be a managed IP network administered by a service provider. The network 565 may be implemented in a wireless fashion, e.g., using wireless protocols and technologies, such as WiFi, WiMax, etc. The network 565 can also be a packet-switched network such as a local area network, wide area network, metropolitan area network, Internet network, or other similar type of network environment. The network 565 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 501 is a PC, workstation, intelligent device or the like, the instructions in the memory 510 may further include a basic input output system (BIOS) (omitted for simplicity). The BIOS is a set of essential software routines that initialize and test hardware at startup, start the OS 511, and support the transfer of data among the hardware devices. The BIOS is stored in ROM so that the BIOS can be executed when the computer 501 is activated.

When the computer 501 is in operation, the processor 505 is configured to execute instructions stored within the memory 510, to communicate data to and from the memory 510, and to generally control operations of the computer 501 pursuant to the instructions.

In an exemplary embodiment, the methods described herein can be implemented with any or a combination of the following technologies, which are each well known in the art: a discreet logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   monitoring, by a server, a round trip latency of a path between a primary storage device and a secondary storage device in a multi-hop storage area network (SAN), the secondary storage device replicating the primary storage device in a replication mode selected from the group consisting of an asynchronous replication mode and a synchronous replication mode, the path comprising a plurality of switches, the monitoring comprising monitoring a number of frame discards at one or more of the plurality of switches and monitoring disk replication pair states at the primary storage device and the secondary storage device;
   based on the replication mode being the asynchronous replication mode and on detecting that the round trip latency of the path has decreased to a value below a synchronous latency threshold value, setting the replication mode to the synchronous replication mode;
   based on the replication mode being the synchronous replication mode and on detecting that the round trip latency of the path has increased to a value above the synchronous latency threshold value, setting the replication mode to the asynchronous replication mode; and
   repeating the monitoring.

2. The method of claim 1, wherein the primary storage device includes a first host bus adapter (HBA) and the secondary storage device includes a second HBA, and the latency is monitored between the first HBA and the second HBA.

3. The method of claim 1, wherein the primary storage device includes a host bus adapter (HBA) and the latency is monitored between the HBA and the storage device.

4. The method of claim 1, wherein the server is in communication with a switch in the SAN that is programmed to receive responses from write requests and the responses received at the switch are used by the server to perform the monitoring.

5. The method of claim 4, wherein the switch is a fiber connection director switch.

6. The method of claim 1, wherein the detecting that the round trip latency has decreased or increased is based on an average of the round trip latency over a period of time.

7. The method of claim 1, wherein the setting the replication mode comprises the server issuing a command to the primary storage device instructing the primary storage device to change the replication mode.

8. The method of claim 7, wherein the setting the replication mode further comprises the server issuing a command to the secondary storage device instructing the secondary storage device to change the replication mode.

9. A system comprising:
   a memory having computer readable instructions; and
   one or more processors for executing the computer readable instructions, the computer readable instructions controlling the one or more processors to perform operations comprising:
   monitoring, by a server, a round trip latency of a path between a primary storage device and a secondary storage device in a multi-hop storage area network (SAN), the secondary storage device replicating the primary storage device in a replication mode selected from the group consisting of an asynchronous replication mode and a synchronous replication mode, the path comprising a plurality of switches, the monitoring comprising monitoring a number of frame discards at one or more of the plurality of switches and monitoring disk replication pair states at the primary storage device and the secondary storage device;
   based on the replication mode being the asynchronous replication mode and on detecting that the round trip latency of the path has decreased to a value below a synchronous latency threshold value, setting the replication mode to the synchronous replication mode;
   based on the replication mode being the synchronous replication mode and on detecting that the round trip latency of the path has increased to a value above the synchronous latency threshold value, setting the replication mode to the asynchronous replication mode; and
   repeating the monitoring.

10. The system of claim 9, wherein the primary storage device includes a first host bus adapter (HBA) and the secondary storage device includes a second HBA, and the latency is monitored between the first HBA and the second HBA.

11. The system of claim 9, wherein the primary storage device includes a host bus adapter (HBA) and the latency is monitored between the HBA and the storage device.

12. The system of claim 9, wherein the server is in communication with a switch in the SAN that is programmed to receive responses from write requests and the responses received at the switch are used by the server to perform the monitoring.

13. The system of claim 12, wherein the switch is a fiber connection director switch.

14. The system of claim 9, wherein the detecting that the round trip latency has decreased or increased is based on an average of the round trip latency over a period of time.

15. The system of claim 9, wherein the setting the replication mode comprises the server issuing a command to the primary storage device instructing the primary storage device to change the replication mode.

16. The system of claim 15, wherein the setting the replication mode further comprises the server issuing a command to the secondary storage device instructing the secondary storage device to change the replication mode.

17. A computer program product comprising a computer readable storage medium having program instructions embodied therewith, the program instructions executable by a processor to cause the processor to perform operations comprising:

monitoring, by a server, a round trip latency of a path between a primary storage device and a secondary storage device in a multi-hop storage area network (SAN), the secondary storage device replicating the primary storage device in a replication mode selected from the group consisting of an asynchronous replication mode and a synchronous replication mode, the path comprising a plurality of switches, the monitoring comprising monitoring a number of frame discards at one or more of the plurality of switches and monitoring disk replication pair states at the primary storage device and the secondary storage device;

based on the replication mode being the asynchronous replication mode and on detecting that the round trip latency of the path has decreased to a value below a synchronous latency threshold value, setting the replication mode to the synchronous replication mode;

based on the replication mode being the synchronous replication mode and on detecting that the round trip latency of the path has increased to a value above the synchronous latency threshold value, setting the replication mode to the asynchronous replication mode; and repeating the monitoring.

18. The computer program product of claim 17, wherein the primary storage device includes a first host bus adapter (HBA) and the secondary storage device includes a second HBA, and the latency is monitored between the first HBA and the second HBA.

19. The computer program product of claim 17, wherein the server is in communication with a switch in the SAN that is programmed to receive responses from write requests and the responses received at the switch are used by the server to perform the monitoring.

20. The computer program product of claim 17, wherein the detecting that the round trip latency has decreased or increased is based on an average of the round trip latency over a period of time.

* * * * *